United States Patent
Fujiwara et al.

(10) Patent No.: US 11,831,037 B2
(45) Date of Patent: Nov. 28, 2023

(54) MANUFACTURING METHOD FOR BATTERY, AND BATTERY

(71) Applicants: TOYOTA JIDOSHA KABUSHIKI KAISHA, Toyota (JP); KOJIMA INDUSTRIES CORPORATION, Toyota (JP)

(72) Inventors: Nobuyoshi Fujiwara, Mishima (JP); Taichi Egawa, Toyota (JP); Tomotaka Osakabe, Miyoshi (JP)

(73) Assignees: TOYOTA JIDOSHA KABUSHIKI KAISHA, Toyota (JP); KOJIMA PRESS INDUSTRY CO., LTD., Toyota (JP)

( * ) Notice: Subject to any disclaimer, the term of this patent is extended or adjusted under 35 U.S.C. 154(b) by 17 days.

(21) Appl. No.: 17/203,456

(22) Filed: Mar. 16, 2021

(65) Prior Publication Data

US 2021/0305652 A1    Sep. 30, 2021

(30) Foreign Application Priority Data

Mar. 31, 2020   (JP) ................. 2020-063384

(51) Int. Cl.
*H01M 50/244*   (2021.01)
*H01M 10/04*    (2006.01)
(Continued)

(52) U.S. Cl.
CPC ......... *H01M 50/244* (2021.01); *H01M 10/04* (2013.01); *H01M 50/204* (2021.01);
(Continued)

(58) Field of Classification Search
CPC .. H01M 50/244; H01M 50/209; H01M 10/04; H01M 50/204; H01M 10/0481; Y02E 60/50; Y02E 60/10; Y02P 70/50
(Continued)

(56) References Cited

U.S. PATENT DOCUMENTS

2008/0124625 A1    5/2008   Hock et al.
2011/0111282 A1*   5/2011   Nagamine ........... H01M 10/625
                                                      429/157
(Continued)

FOREIGN PATENT DOCUMENTS

CN    101167197 A    4/2008
CN    104521024 A    4/2015
(Continued)

*Primary Examiner* — Chanceity N Robinson
*Assistant Examiner* — Omar M Kekia
(74) *Attorney, Agent, or Firm* — Oliff PLC (57) ABSTRACT

A manufacturing method for a battery including a cell array and a case is provided. The cell array includes a plurality of single cells arranged in a certain direction. The case includes a pair of compartment members of which a longitudinal direction is a direction in which the single cells are arranged, and a first end member provided at a first end in the longitudinal direction. In the manufacturing method, in space surrounded by the compartment members and the first end member, the cell array and a second end member facing the first end member across the cell array are placed. In a direction to compress the cell array from an outside part of the second end member, each compartment member is joined with the second end member at a second end in the longitudinal direction while a predetermined load is applied to bind the cell array.

10 Claims, 7 Drawing Sheets

(51) Int. Cl.
*H01M 50/204* (2021.01)
*H01M 50/209* (2021.01)

(52) U.S. Cl.
CPC ...... *H01M 10/0481* (2013.01); *H01M 50/209* (2021.01); *Y02E 60/10* (2013.01); *Y02E 60/50* (2013.01); *Y02P 70/50* (2015.11)

(58) Field of Classification Search
USPC ................................................ 29/623, 623.1
See application file for complete search history.

(56) References Cited

U.S. PATENT DOCUMENTS

| | | |
|---|---|---|
| 2014/0038030 A1 | 2/2014 | Goesmann |
| 2015/0064542 A1 | 3/2015 | Noh et al. |
| 2015/0214570 A1 | 7/2015 | Deponte et al. |
| 2016/0043365 A1 | 2/2016 | Vogel et al. |
| 2018/0301676 A1 | 10/2018 | Kim et al. |
| 2019/0267591 A1 | 8/2019 | Park et al. |
| 2020/0243816 A1 | 7/2020 | Terauchi et al. |
| 2021/0119250 A1* | 4/2021 | Taniuchi ............ H01M 10/0585 |
| 2021/0184306 A1* | 6/2021 | Baek .................... H01M 50/209 |
| 2021/0351472 A1* | 11/2021 | Terauchi ............. H01M 50/289 |

FOREIGN PATENT DOCUMENTS

| | | |
|---|---|---|
| JP | 2014-517995 A | 7/2014 |
| JP | 2015-050187 A | 3/2015 |
| JP | 2017-021960 A | 1/2017 |
| JP | 2019-075226 A | 5/2019 |
| JP | 2020-501320 A | 1/2020 |
| WO | 2006/104442 A1 | 10/2006 |
| WO | 2019/031169 A1 | 2/2019 |

\* cited by examiner

MANUFACTURING METHOD FOR BATTERY, AND BATTERY

CROSS-REFERENCE TO RELATED APPLICATION

This application claims priority to Japanese Patent Application No. 2020-063384 filed on Mar. 31, 2020, incorporated herein by reference in its entirety.

BACKGROUND

1. Technical Field

The disclosure relates to a manufacturing method for a battery, and a battery.

2. Description of Related Art

Japanese Unexamined Patent Application Publication No. 2019-075226 (JP 2019-075226 A) describes a manufacturing method for a battery including a tray-shaped accommodation part and a cell array. With this existing method, a cell array is prepared. The cell array includes a plurality of single cells arranged in a certain direction. An end member is provided at each end of these single cells in the array direction. A jig (binding jig) for binding the cell array is detachably attached to each end member.

With this existing method, spacers are placed at one end of the accommodation part in the longitudinal direction. The spacers are used to adjust a binding load for the cell array accommodated in the accommodation part. A jig (clamping spacer) is attached to one end of the accommodation part in which the spacers are placed. The clamping spacer is used to avoid the spacers from falling down in the accommodation part.

With the existing method, while the spacers are being pressed against one end of the accommodation part by the clamping spacer, the cell array bound by the binding jigs is inserted in the accommodation part. After that, the binding jigs are removed from the end members, and the clamping spacer is removed from the accommodation part. Through the above steps, the cell array is accommodated in the accommodation part in a bound state.

SUMMARY

However, the existing method using spacers has the following inconveniences. First, a spacer having a desired size needs to be prepared each time a battery is manufactured. Therefore, a manufacturing process tends to be complicated, and the productivity of a battery may decrease. Second, space corresponding to the thickness of a clamping spacer needs to be ensured in the accommodation part. Therefore, an increase in the size of a battery is unavoidable.

An increase in the size of a battery can also occur as a result of ensuring space corresponding to the thickness of each binding jig. In addition, in the existing method, at the time of inserting a cell array into the accommodation part by using the binding jigs, a load greater than a binding load for an accommodated cell array is temporarily applied to the cell array. Applying more than necessary load may lead to a decrease in yield and reliability of an end product.

The disclosure provides a technique for making it possible to enhance the productivity of a battery. The disclosure also provides a technique for making it possible to suppress an increase in the size of a battery. Furthermore, the disclosure provides a technique for making it possible to suppress a decrease in yield and reliability of an end product.

A first aspect of the disclosure relates to a manufacturing method for a battery including a cell array and a case. The cell array includes a plurality of single cells arranged in a certain direction. The case includes a pair of compartment members of which a longitudinal direction is a direction in which the single cells are arranged, and a first end member provided at a first end in the longitudinal direction. The manufacturing method includes: in space surrounded by the compartment members and the first end member, placing the cell array, and a second end member facing the first end member across the cell array; and joining each of the compartment members with the second end member at a second end in the longitudinal direction while applying a load to bind the cell array in a direction to compress the cell array from an outside part of the second end member.

With the above configuration, the case is joined with the second end member while a load is applied to bind the cell array. Therefore, without using a spacer that is indispensable in the existing battery, it is possible to easily realize a binding load for the cell array in an end product. As a result, the productivity of a battery is enhanced.

It is also expected to simplify management of the size of the cell array in the array direction. Therefore, a decrease in yield and reliability of an end product is suppressed. In addition, manufacturing cost is reduced.

A battery can be manufactured without using a spacer. Therefore, an increase in the size of an end product is suppressed, and cost of an end product is also reduced.

In the first aspect, the case may further include a coupling member coupling the compartment members. The manufacturing method may further include preparing a frame member of the case. In preparing the frame member, the compartment members and the coupling member may be integrally molded by press working of a piece of sheet material.

With the above configuration, in preparing the frame member, the compartment members and the coupling member are integrally molded by press working of a piece of sheet material. Therefore, manufacturing cost is reduced. An increase in the thickness of the case is suppressed as compared to the case where the case is prepared by die casting. As a result, an increase in the size of an end product is suppressed.

In the first aspect, in a depth direction of the case, perpendicular to the longitudinal direction, a length of the second end member may be less than or equal to a length of each of the compartment members facing the second end member. In joining each of the compartment members with the second end member, an edge of the second end member may be welded to a surface of each of the compartment members, facing the edge.

With the above configuration, in joining each of the compartment members with the second end member having a length less than or equal to the length of each of the compartment members in the depth direction of the case, the edge of the second end member is welded to the surface of each of the compartment members, facing the edge. Therefore, the edge of the second end member is reliably joined with the surface of each of the compartment members.

In the first aspect, joining each of the compartment members with the second end member may include applying the load to a center part of a side face of the second end member, and welding an edge of the second end member to a surface of each of the compartment members, facing the edge.

With the above configuration, while a load is being applied to the center part of the side face of the second end member, the edge of the second end member is welded to the surface of each of the compartment members, facing the edge. Therefore, the edge of the second end member is joined with the surface of each of the compartment members while a load applied to the cell array is maintained at a predetermined load.

In the first aspect, the second end member may include a tray-shaped member and a support member. The tray-shaped member may have an outer face facing a side face of the cell array. The support member may support an inner face of the tray-shaped member. The support member may include a contact part, a parallel part, and a coupling part. The contact part may be in contact with the inner face. The parallel part may extend parallel to the contact part. The coupling part may couple the contact part and the parallel part. The contact part and the parallel part may extend in a direction in which the compartment members face each other. In joining each of the compartment members with the second end member, the load may be applied to the parallel part.

With the above configuration, in joining each of the compartment members with the second end member, a load is applied to the parallel part of the support member. The support member includes not only the parallel part but also the contact part and the coupling part. Therefore, a load applied to the parallel part in joining each of the compartment members with the second end member is also applied to the tray-shaped member via the coupling part and the contact part. The contact part and the parallel part extend in a direction in which the compartment members face each other. Therefore, a load applied to the tray-shaped member spreads in this direction. Thus, a uniform pressure is applied to the side face of the cell array in the horizontal direction. As a result, a decrease in yield and reliability of an end product is suppressed by stabilizing joining of each of the compartment members with the second end member.

In the first aspect, the second end member may include a tray-shaped member and a support member. The tray-shaped member may have an outer face facing a side face of the cell array. The support member may support an inner face of the tray-shaped member. The support member may include a contact part, a parallel part, and a coupling part. The contact part may be in contact with the inner face. The parallel part may be provided parallel to the contact part. The coupling part may couple the contact part and the parallel part. The contact part and the parallel part may extend in a direction in which the compartment members face each other. The manufacturing method may further include preparing the second end member. In preparing the second end member, an edge of the parallel part may be welded to the inner face facing the edge. In joining each of the compartment members with the second end member, an edge of the tray-shaped member may be welded to a surface of each of the compartment members, facing the edge. In a direction of the tray-shaped member, parallel to the longitudinal direction, a joining area joined with each of the compartment members may be different from a joining area joined with the support member.

With the above configuration, a joining area of the tray-shaped member with each of the compartment members in joining each of the compartment members with the second end member can be formed at a position different from a joining area of the tray-shaped member with the support member, formed in preparing the second end member. Therefore, the strength of joining the tray-shaped member with the compartment members is ensured.

In the first aspect, the manufacturing method may further include preparing a frame member of the case, preparing the first end member, and preparing the case. Preparing the case may include placing the first end member at an end of the frame member, and joining each of the compartment members with the first end member.

With the above configuration, the case is easily prepared. Therefore, an end product is manufactured at low cost.

In the first aspect, the first end member and the second end member may be made from a same member. The manufacturing method may further include preparing the first end member and the second end member.

With the above configuration, the first and second end members can be prepared at the same time. Therefore, in comparison with the case where these end members are separately prepared by using different members, manufacturing cost and cost of an end product are reduced.

A second aspect of the disclosure relates to a battery manufactured in the first aspect.

According to the second aspect, a high-reliability, small-sized battery is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a manufacturing method for a battery according to an embodiment of the disclosure and a battery manufactured by the manufacturing method will be described with reference to the accompanying drawings. The battery manufactured by the manufacturing method is suitably applied to mobile units, such as vehicles.

1. Manufacturing Method for Battery 1-1. Procedure of Manufacturing Method

Figure 1:
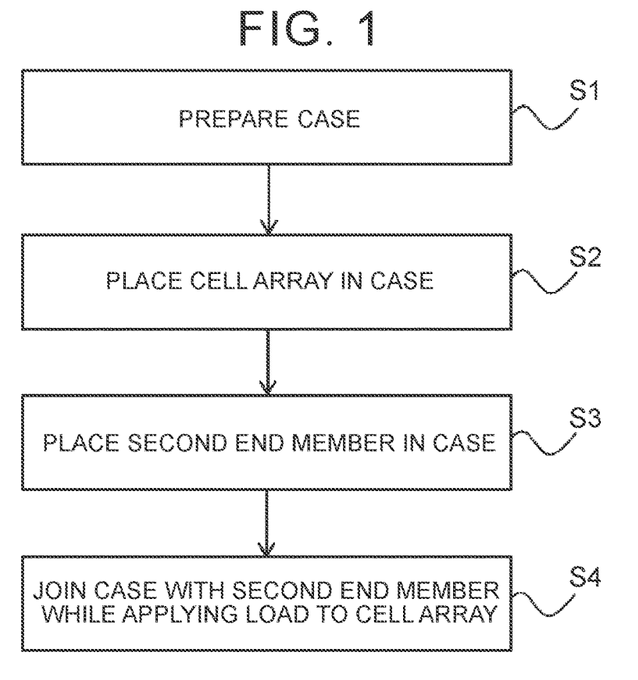
FIG. 1 is a flowchart illustrating a manufacturing method for a battery according to an embodiment.

FIG. 1 is a flowchart illustrating a manufacturing method for a battery according to the present embodiment. As shown in FIG. 1, the manufacturing method according to the present embodiment includes preparing major constituent members of a battery (S1), placing a cell array in an accommodation space of a case (S2), placing a second end member in the accommodation space (S3), and joining the case with the second end member while applying a load to the cell array (S4). Hereinafter, step S1 to step S4 will be described.

1-2. Description of Steps

1-2-1. Step S1

Figure 2:
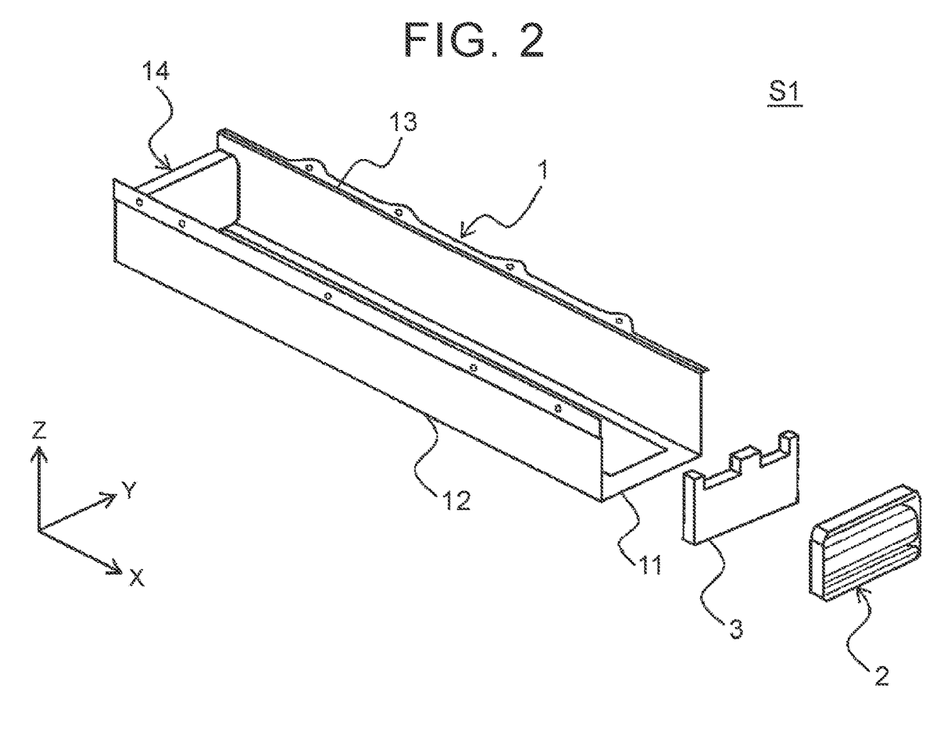
FIG. 2 is a view showing a first example of step S1.

In step S1, major constituent members of a battery are prepared. FIG. 2 is a view showing a first example of step S1. In the first example, a case 1, a second end member 2, and a plurality of single cells 3 are prepared as constituent members. FIG. 2 shows only one of the single cells 3.

The case 1 includes a base plate 11, a pair of side plates 12, 13, and a first end member 14. One end of the case 1 in a longitudinal direction (X-axis direction) is open. One end of the case 1 in a depth direction (Z-axis direction) is also open. The base plate 11 is a coupling member that couples the side plates 12, 13. A rectangular slit is formed at the center of the base plate 11 along the longitudinal direction of the case 1. The slit is formed for the purpose of cooling the single cells 3. The first end member 14 is provided at an end (first end) of the case 1 in the longitudinal direction. The first end member 14 is connected to the side plates 12, 13. The first end member 14 may be further connected to the base plate 11.

The second end member 2 becomes a part of the battery when combined with the first end member 14. In an end product, the second end member 2 clamps and binds a cell array together with the first end member 14. The cell array is a stack of the single cells 3 arranged along the longitudinal direction of the case 1. The details of the configuration of the second end member 2 will be described later.

Each of the single cells 3 is made up of a resin frame and a so-called membrane electrode assembly. The configuration of such a single cell 3 is known. Therefore, the description of the configuration of each single cell 3 is omitted.

Figure 3:
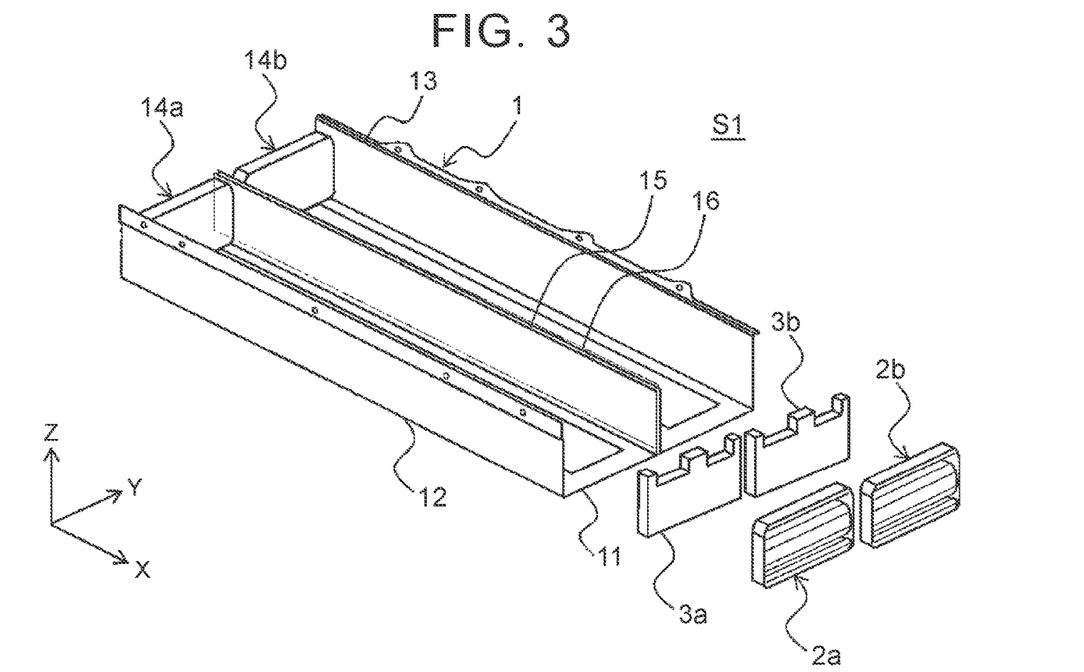
FIG. 3 is a view showing a second example of step S1.

FIG. 3 is a view showing a second example of step S1. In the second example, second end members 2a, 2b are prepared as constituent members. In the second example, a plurality of single cells 3a and a plurality of single cells 3b are prepared as constituent members. FIG. 3 shows only one set of the single cells 3a and the single cells 3b. In the second example, partition plates 15, 16 are further prepared as constituent members. The second end members 2a, 2b are the same members. The same members mean that materials used and shapes are the same. The single cells 3a, 3b are also the same members. The partition plates 15, 16 are also the same members.

In the second example, the case 1 includes the base plate 11, the pair of side plates 12, 13, first end members 14a, 14b, and the partition plates 15, 16. The partition plate 15 is connected to the first end member 14a. The first end member 14a is connected to the side plate 12. The partition plate 16 is connected to the first end member 14b. The first end member 14b is connected to the side plate 13. The first end members 14a, 14b may be further connected to the base plate 11.

The partition plate 15 defines an accommodation space of the case 1 when combined with the side plate 12. The partition plate 16 defines another accommodation space of the case 1 when combined with the side plate 13. These accommodation spaces are formed in a width direction (Y-axis direction) of the case 1. In this way, the side plates 12, 13 and the partition plates 15, 16 can serve as compartment members of the case 1 according to a combination of the plates. In the second example, one of the partition plates 15, 16 may be omitted. In this case, the function of the omitted partition plate just needs to be imparted to the remaining partition plate.

1-2-2. Step S2

Figure 4:
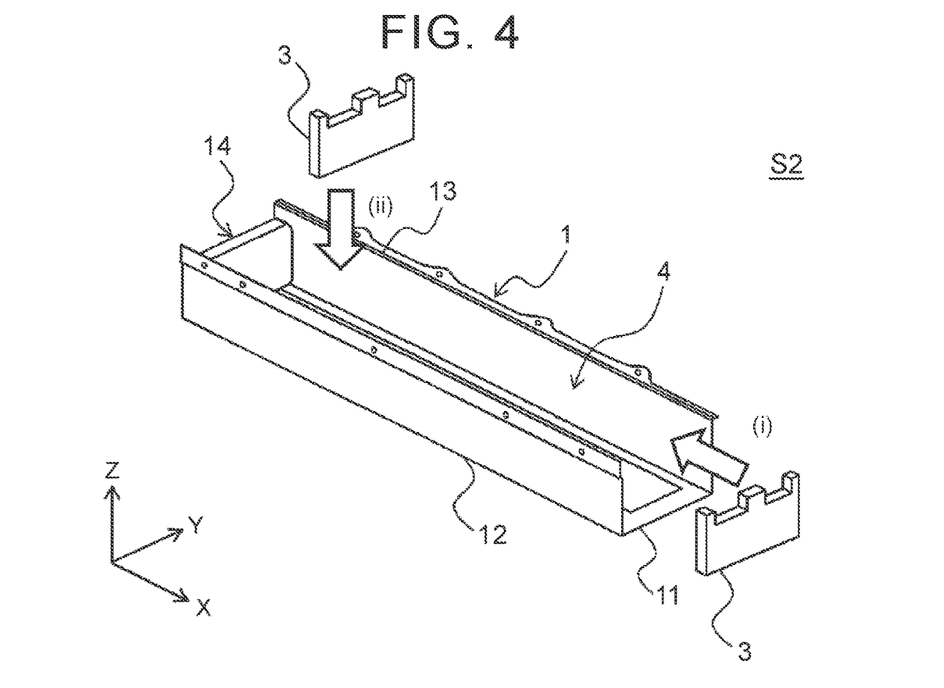
FIG. 4 is a view showing a first example of step S2.

In step S2, the cell array is placed in the accommodation space of the case. FIG. 4 is a view showing a first example of step S2. In the first example, each of the single cells 3 is independently arranged in an accommodation space 4 of the case 1. The accommodation space 4 is the space surrounded by at least the side plates 12, 13 and the first end member 14. The accommodation space 4 is actually the space surrounded by the base plate 11, the side plates 12, 13, and the first end member 14.

A direction in which each individual single cell 3 is inserted into the accommodation space 4 may be the longitudinal direction ((i) direction) of the case 1 or may be the depth direction ((ii) direction) of the case 1. The single cells 3 arranged in the accommodation space 4 make up a cell array. The total number of the single cells 3 is changed as needed according to the size of the accommodation space 4 in the longitudinal direction of the case 1 and the size of each individual single cell 3 in the thickness direction.

Figure 5:
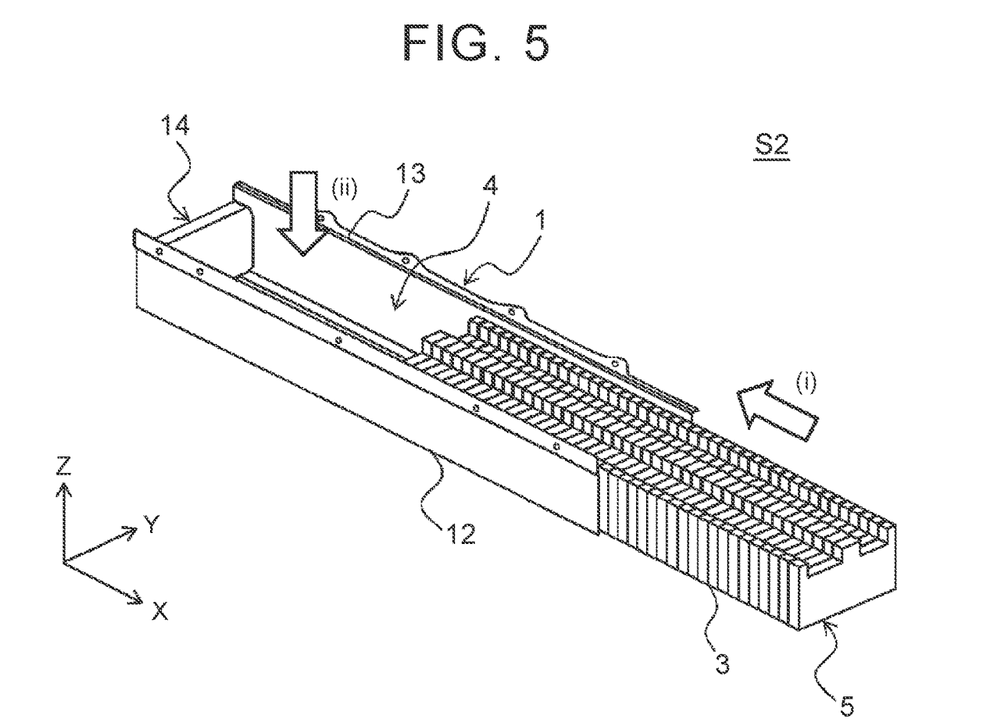
FIG. 5 is a view showing a second example of step S2.

FIG. 5 is a view showing a second example of step S2. In the second example, a cell array 5 is assembled outside the case 1 (accommodation space 4). Insertion of the cell array 5 into the accommodation space 4 is performed while the array direction of the cell array 5 is aligned in the longitudinal direction of the case 1. A direction in which the cell array 5 is inserted may be the longitudinal direction ((i) direction) of the case 1 or may be the depth direction ((ii) direction) of the case 1.

1-2-3. Step S3

Figure 6:
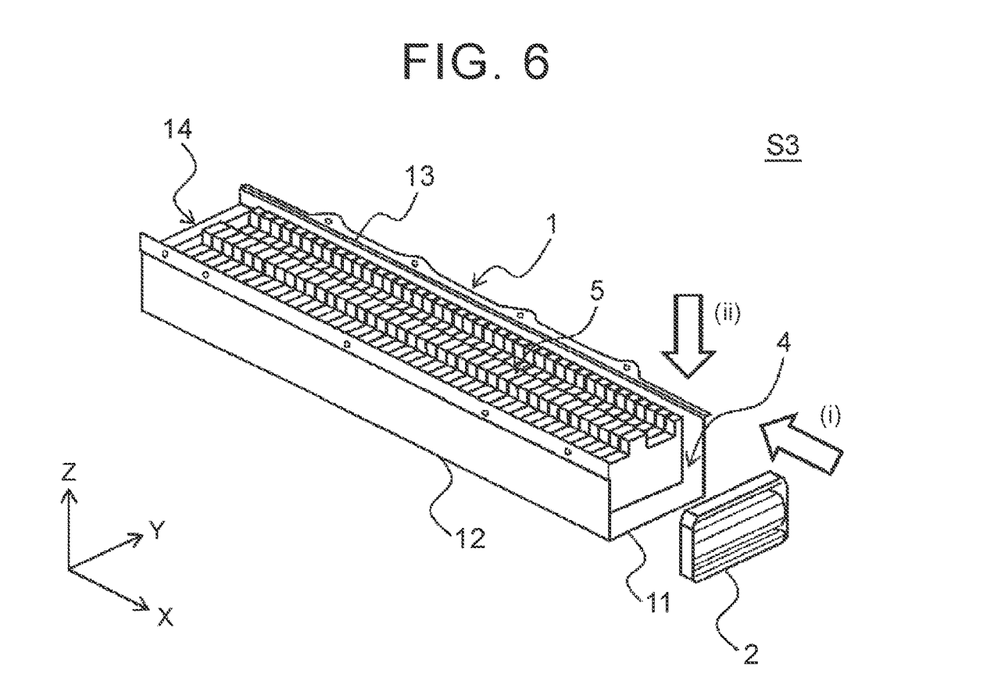
FIG. 6 is a view showing an example of step S3.

In step S3, the second end member is placed in the accommodation space. FIG. 6 is a view showing an example of step S3. In this example, the second end member 2 is placed so as to face the first end member 14 across the cell array 5. A direction in which the second end member 2 is inserted into the accommodation space 4 may be the longitudinal direction ((i) direction) of the case 1 or may be the depth direction ((ii) direction) of the case 1.

Step S3 may be performed as part of step S2. Specifically, in the first example illustrated in FIG. 4, the second end member 2 may be attached to and combined with the single cell 3 located at a terminal end of the cell array 5 in the array direction, and then the combined component may be placed in the accommodation space 4. In this case, step S3 is substantially incorporated into step S2. In the second example illustrated in FIG. 5, the second end member 2 may be attached to and combined with a terminal end of the cell array 5 in the array direction, and the combined component may be placed in the accommodation space 4.

1-2-4. Step S4

Figure 7:
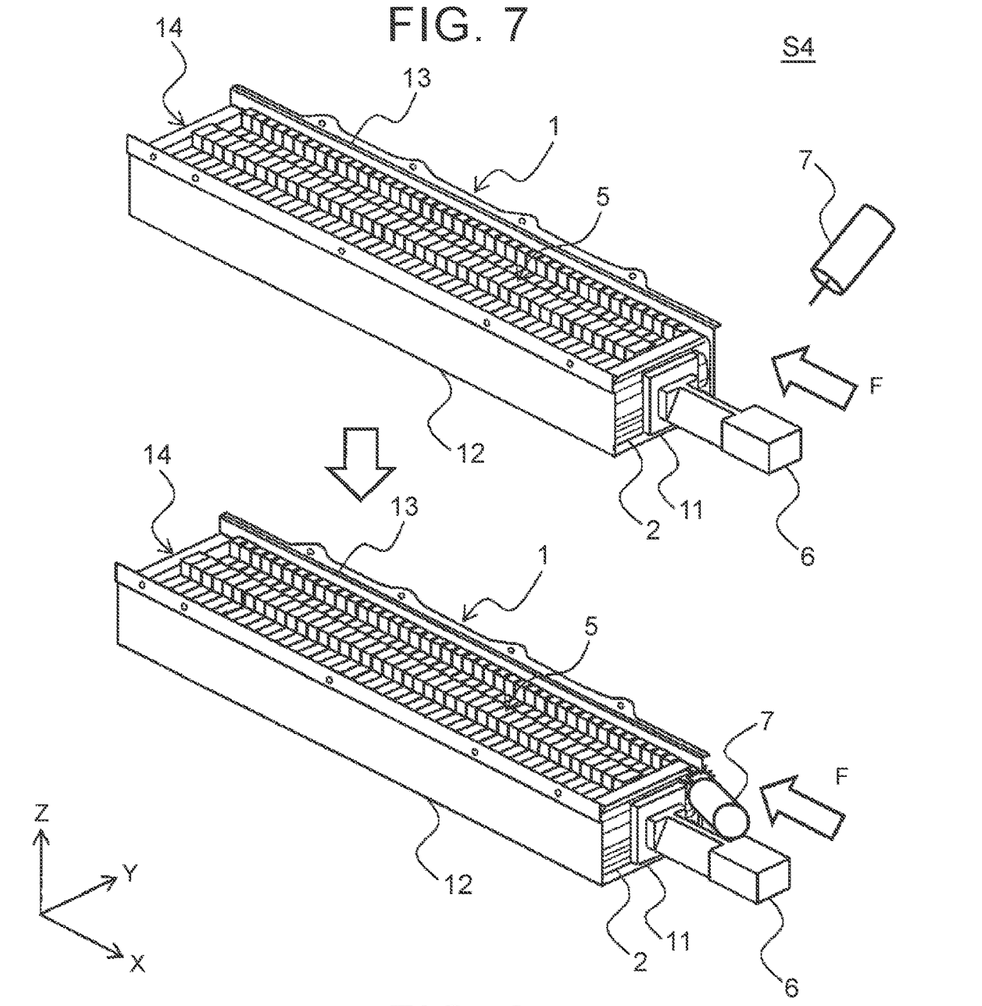
FIG. 7 is a view showing an example of step S4.

In step S4, the case is joined with the second end member while a load is being applied to the cell array. FIG. 7 is a view showing an example of step S4. In the example shown in FIG. 7, a pressure jig 6 is pressed against the center of the side face of the second end member 2. Movement of the case 1 in the longitudinal direction is restricted by a fixture jig (not shown). Therefore, when the pressure jig 6 is moved along the longitudinal direction of the case 1, the cell array 5 is compressed in this direction (that is, the array direction) (the upper view in FIG. 7).

A load F applied to the cell array 5 by the pressure jig 6 is measured by a load sensor (not shown). Movement of the pressure jig 6 is continued until the measured load becomes greater than or equal to a predetermined load. The predetermined load is set in advance according to a binding load for the cell array 5 in an end product.

When the measured load becomes greater than or equal to the predetermined load, movement of the pressure jig 6 is stopped. When movement of the pressure jig 6 is stopped, the second end member 2 stops at an end (second end) of the case 1 in the longitudinal direction. A stop position of the pressure jig 6 (that is, a stop position of the second end member 2) may be minutely adjusted according to a measured load such that the measured load is maintained at the predetermined load. In the example shown in FIG. 7, while the measured load is maintained at the predetermined load, the case 1 is joined with the second end member 2 (the lower view in FIG. 7). This joining is performed by using a joining jig 7. Joining with the use of the joining jig 7 is performed by using so-called fusion welding, such as arc welding and laser welding.

Figure 8:
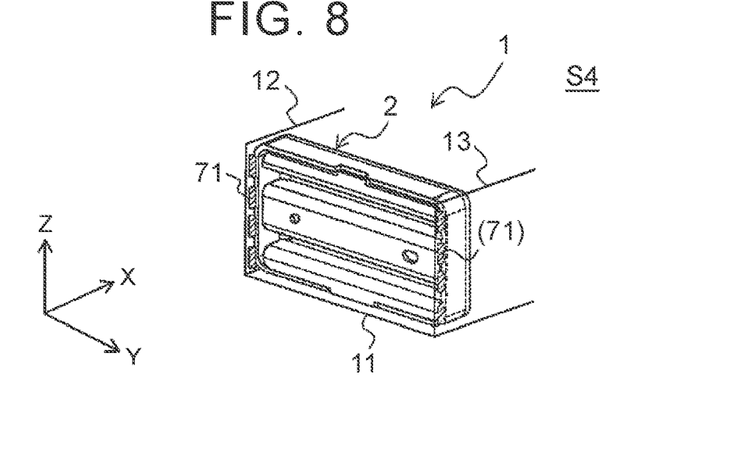
FIG. 8 is a view showing an example of joining areas where a case is joined with a second end member.

FIG. 8 is a view showing an example of joining areas where the case 1 is joined with the second end member 2. As shown in FIG. 8, the joining areas 71 are formed on the surfaces of the side plates 12, 13, facing the edge of the second end member 2, in a band shape along the edge. The length of the second end member 2 in the depth direction of the case 1 is shorter than that of the side plate 12 or side plate 13. Therefore, the joining areas 71 are definitely formed on the surfaces of the side plates 12, 13, facing the edge of the second end member 2. The shape of each joining area 71 is not limited and may be a dot shape. The number of the joining areas 71 is also not limited. The joining area 71 may be formed one by one on each of the surfaces of the side plates 12, 13.

When the joining areas 71 are formed on the surfaces of the side plates 12, 13, the second end member 2 is joined at the stop position. When the joining areas 71 are formed, the cell array 5 is bound by the first end member 14 and the second end member 2. A binding load for the cell array 5 at this time is equal to the predetermined load.

When the joining areas 71 are formed, the side plates 12, 13 are able to bear a force applied thereto in the width direction of the case 1, so deformation of the side plates 12, 13 is suppressed. The joining areas 71 may be formed on the surface of the base plate 11, facing the edge of the second end member 2. When the joining areas 71 are formed on the surface of the base plate 11, the base plate 11 is able to bear a force applied thereto in the depth direction of the case 1.

Figure 9:
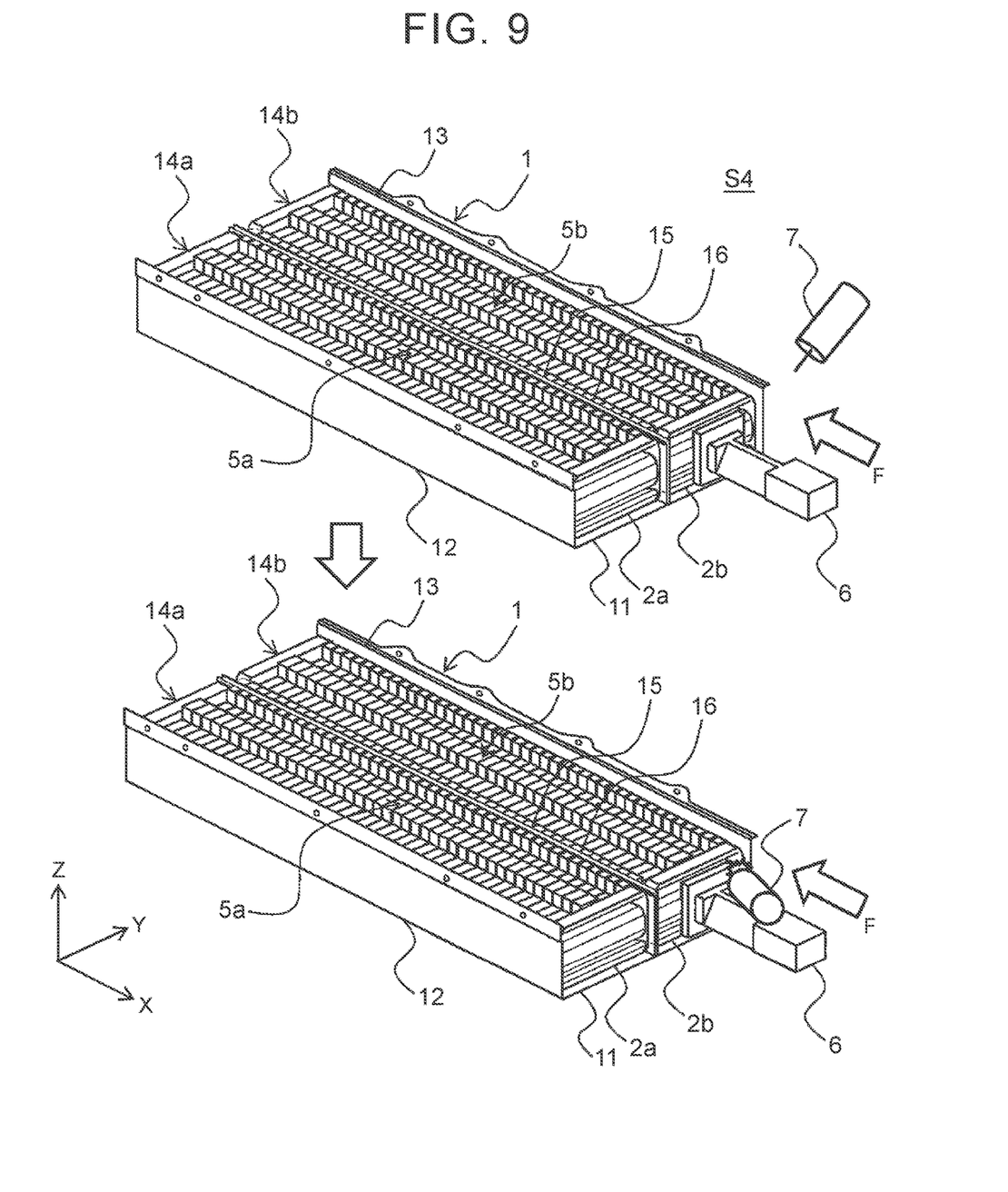
FIG. 9 is a view showing an example of step S4 applied to a case including partition plates.

FIG. 9 is a view showing an example of step S4 applied to the case 1 including the partition plates 15, 16, illustrated in FIG. 3. In the example shown in FIG. 9, joining of the case 1 with the second end member 2a and joining of the case 1 with the second end member 2b are performed independently of each other. Specifically, a series of processes for joining, illustrated in FIG. 7, is performed in order of the second end members 2a, 2b. In the example shown in FIG. 9, the second end member 2a is joined with the side plate 12 and the partition plate 15. The second end member 2b is joined with the side plate 13 and the partition plate 16.

In another example of step S4 applied to the case 1 including the partition plates 15, 16, while both cell arrays 5a, 5b are being compressed, the case 1 is joined with the second end members 2a, 2b at the same time. In this example, to compress the cell arrays 5a, 5b, two pressure jigs 6 are used.

1-3. Detailed Description of Step S1

Figure 10:
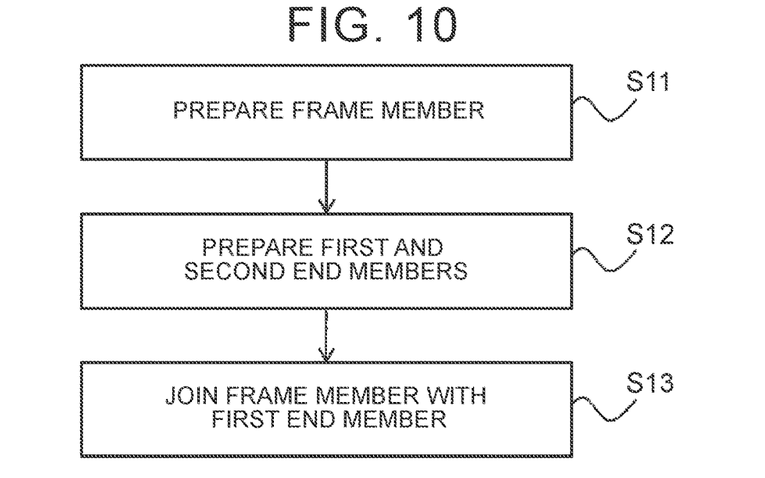
FIG. 10 is a flowchart illustrating a preparation method for constituent members in step S1.

FIG. 10 is a flowchart illustrating a preparation method for constituent members in step S1. As shown in FIG. 10, the preparation method in step S1 includes preparing a frame member (S11), preparing first and second end members (S12), and joining the frame member with the first end member (S13) as sub-steps. The sequence of step S11 and step S12 may be reversed. Hereinafter, step S11 to step S13 will be described.

1-3-1. Step S11

In step S11, a frame member is prepared. The frame member is integrally molded by working of a piece of metal sheet material. Working of a metal sheet material includes press working (for example, draw forming and bending forming), die cutting, and punching. When press working is performed, a member having a substantially U-shaped accommodating shape in cross section is obtained. When die cutting is performed on the base plate of the member, a metal sheet material having an area corresponding to the slit of the base plate 11 is stamped. When punching is performed, various screw holes are formed in the metal sheet material. When a series of processes is performed, a frame member including the base plate 11 and the side plates 12, 13 is prepared.

When the case 1 including the partition plates 15, 16, illustrated in FIG. 3, is prepared, partition plates are prepared in addition to the frame member in step S11. The partition plates are also molded by working of a metal sheet material.

1-3-2. Step S12

Figure 11:
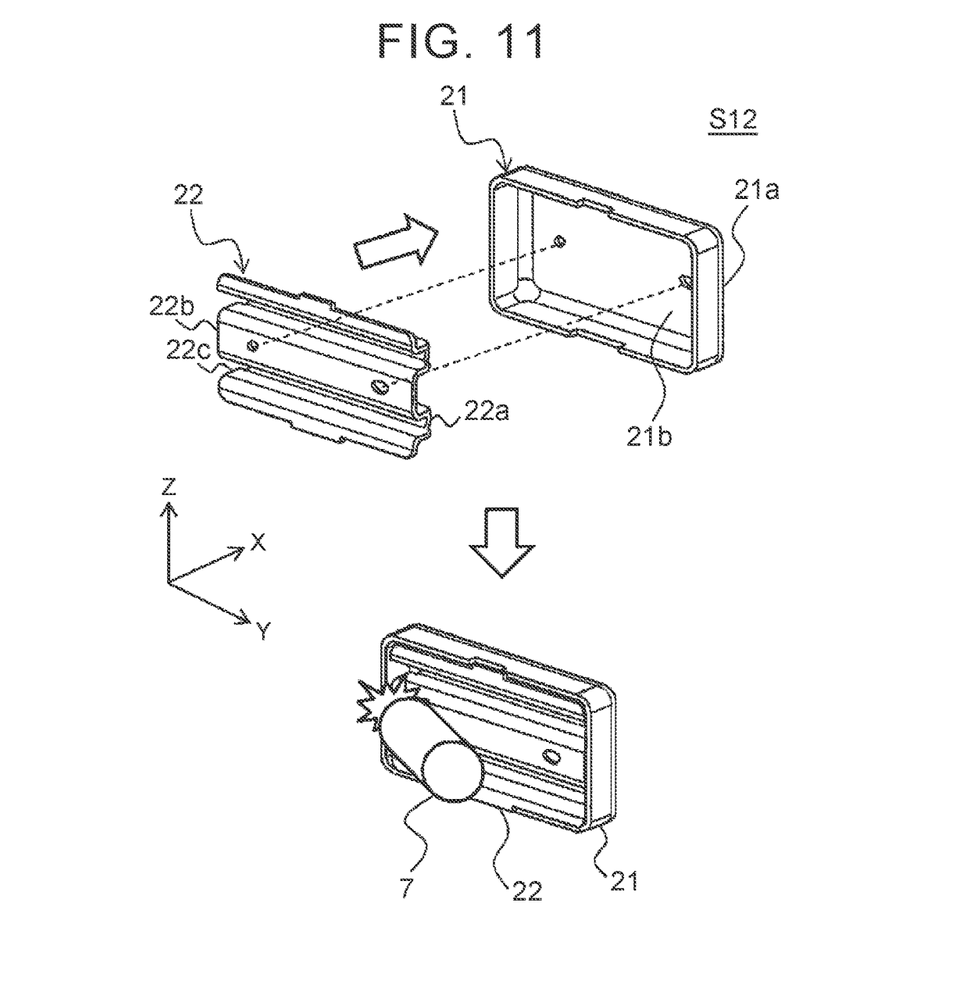
FIG. 11 is a view showing an example of step S12.

In step S12, first and second end members are prepared. The first and second end members are the same members. Therefore, at the stage of step S12, it is not determined which one of the first and second end members is used as which end member. Hereinafter, the description will be made on the assumption that the second end member is prepared. FIG. 11 is a view showing an example of step S12. In the example shown in FIG. 11, initially, a tray-shaped member 21 and a support member 22 are prepared (the upper view in FIG. 11).

The tray-shaped member 21, as well as the frame member, is molded by working of a metal sheet material. The tray-shaped member 21 includes an outer face 21a and an inner face 21b. The outer face 21a is a face facing the side face of the cell array 5 in an end product. The inner face 21b is a face supported by the support member 22.

The support member 22 is also molded by working of a metal sheet material. The support member 22 includes contact parts 22a, parallel parts 22b, and coupling parts 22c. The contact parts 22a are parts that contact with the inner face 21b when the support member 22 is combined with the tray-shaped member 21. The parallel parts 22b are parts extending parallel to the contact parts 22a. The parallel parts 22b are parts against which the pressure jig 6 is pressed in step S4. The coupling parts 22c are parts coupling the contact parts 22a and the parallel parts 22b. The number of the contact parts 22a is two. The number of the parallel parts 22b is three. The number of the coupling parts 22c is four.

As shown in FIG. 11, the support member 22 has a substantially W-shape in cross section. The outer peripheries of the parallel parts 22b and coupling parts 22c contact with the inner face 21b when the support member 22 is combined with the tray-shaped member 21. In this way, the contact parts 22a, parallel parts 22b, and coupling parts 22c of the support member 22 support the inner face 21b.

In the example shown in FIG. 11, subsequently, the tray-shaped member 21 is joined with the support member 22 (the lower view in FIG. 11). This joining is performed by using the joining jig 7. Joining with the use of the joining jig 7 is performed by using so-called fusion welding, such as arc welding and laser welding.

Figure 12:
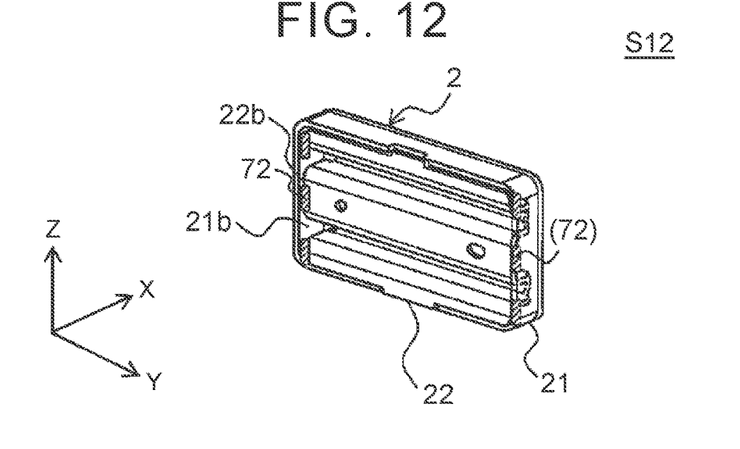
FIG. 12 is a view showing an example of joining areas where a tray-shaped member is joined with a support member.

FIG. 12 is a view showing an example of joining areas where the tray-shaped member 21 is joined with the support member 22. As shown in FIG. 12, the joining areas 72 are formed in a band shape along the edges of the parallel parts 22b on the inner face 21b facing the edges. The shape of each joining area 72 is not limited and may be a dot shape. The number of the joining areas 72 is also not limited.

Figure 13:
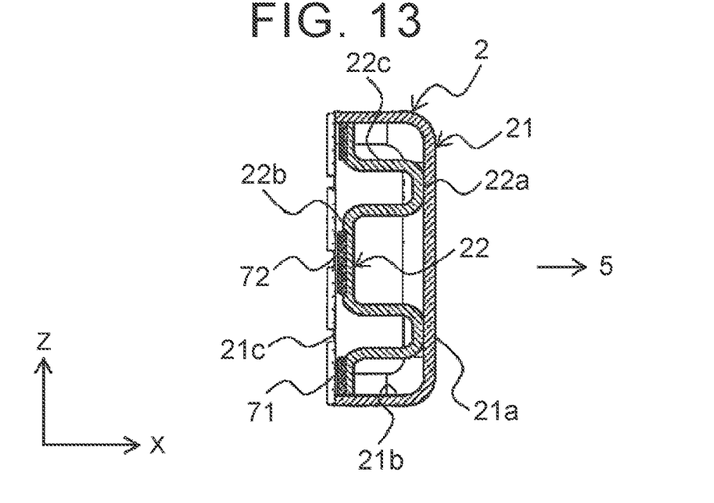
FIG. 13 is a view illustrating a positional relation between the joining areas illustrated in FIG. 12 and the joining areas illustrated in FIG. 8.

The positional relation between the joining areas 72 illustrated in FIG. 12 and the joining areas 71 illustrated in FIG. 8 will be described. FIG. 13 is a cross-sectional view showing an example of the positions of the joining areas 71, 72. As shown in FIG. 13, the length of the support member 22 in a depth direction (X-axis direction) is shorter than the length of the tray-shaped member 21 in a height direction (X-axis direction). Therefore, the joining areas 72 are definitely formed on the inner face 21b facing the edges of the parallel parts 22b. On the other hand, as described with reference to FIG. 8, the joining areas 71 are formed along the edge of the second end member 2. Therefore, in the X-axis direction, the joining areas 72 are located closer to the cell array 5 than the joining areas 71.

1-3-3. Step S13

Figure 14:
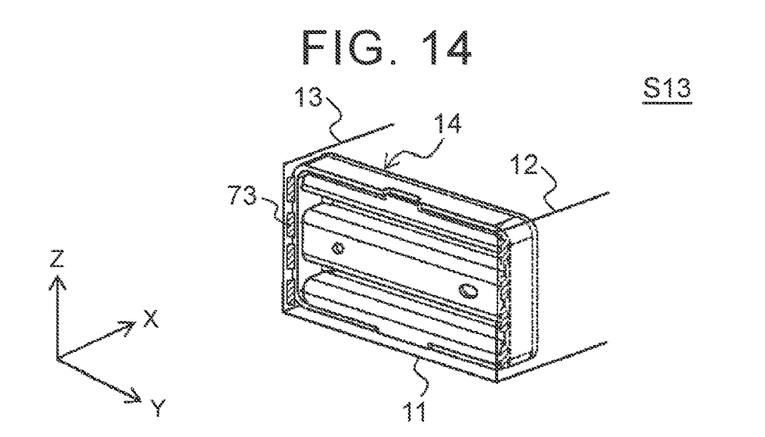
FIG. 14 is a view showing an example of joining areas where a frame member is joined with a first end member.

In step S13, the frame member is joined with the first end member. In step S13, initially, the first end member is placed at an end (first end) of the frame member in the longitudinal direction. Subsequently, the frame member is joined with the first end member. This joining is performed by using the joining jig 7. Joining with the use of the joining jig 7 is performed by using so-called fusion welding, such as arc welding and laser welding.

FIG. 14 is a view showing an example of joining areas where the frame member is joined with the first end member. As shown in FIG. 14, the joining areas 73 are formed on the surfaces of the side plates 12, 13, facing the edge of the first end member 14, in a band shape along the edge. The length of the first end member 14 in the depth direction of the frame member is shorter than that of the side plate 12 or side plate 13. Therefore, the joining areas 73 are definitely formed on the surfaces of the side plates 12, 13, facing the edge of the first end member 14. As in the case of the joining areas 71 illustrated in FIG. 8, the shape and number of the joining areas 73 are not limited.

In another example of step S13, the first end member 14 is screwed to the frame member. In another example of step S13, the first end member 14 is joined with the frame member by means of friction stir welding. In further another example of step S13, the first end member 14 is joined with the frame member by using adhesive agent.

When the case 1 including the partition plates 15, 16, illustrated in FIG. 3, is prepared, the frame member and the partition plate 15 are joined with the first end member 14a in step S13. In addition, the frame member and the partition plate 16 are joined with the first end member 14b.

Through a series of step S11 to step S13, the case 1 is prepared.

1-4. Advantageous Effects

With the manufacturing method according to the present embodiment, in step S4, the case 1 is joined with the second end member 2 while a predetermined load is being applied to the cell array 5. Therefore, without using a spacer that is indispensable in the existing battery, it is possible to easily realize a binding load for the cell array 5 in an end product. As a result, the productivity of a battery is enhanced.

With the manufacturing method according to the present embodiment, it is also expected to simplify management of the size of the cell array 5 in the array direction in step S4. Therefore, a decrease in yield and reliability of an end product is suppressed. In addition, manufacturing cost is reduced.

With the manufacturing method according to the present embodiment, a battery can be manufactured without using a spacer. Therefore, an increase in the size of an end product is suppressed, and cost of an end product is also reduced.

With the manufacturing method according to the present embodiment, the joining areas 71 are formed on the surfaces of the side plates 12, 13, facing the edge of the second end member 2, along the edge in step S4. Therefore, the side plates 12, 13 are able to bear a force applied thereto in the width direction of the case 1, so an end product in which deformation of the side plates 12, 13 is suppressed is obtained.

With the manufacturing method according to the present embodiment, the frame member of the case 1 is integrally molded by press working of a piece of metal sheet material in step S11. Therefore, manufacturing cost is reduced. An increase in the thickness of the case 1 is suppressed as compared to the case where the case 1 is prepared by die casting. As a result, an increase in the size of an end product is suppressed.

With the manufacturing method according to the present embodiment, the edge of the second end member 2 is welded to the surfaces of the side plates 12, 13, facing the edge, in step S4. The length of the second end member 2 in the depth direction of the frame member is shorter than that of the side plate 12 or side plate 13. Therefore, the edge of the second end member can be reliably joined with the surfaces of these side plates.

With the manufacturing method according to the present embodiment, the second end member is prepared in step S12. Therefore, a load applied from the pressure jig 6 in step S4 can spread in a direction in which the side plates 12, 13 face each other, and a uniform pressure in the horizontal direction can be applied to the side face of the cell array 5. As a result, a decrease in yield and reliability of an end product is suppressed by stabilizing joining of the case 1 with the second end member 2.

With the manufacturing method according to the present embodiment, in step S4, the joining areas 71 can be formed at positions different from the positions of the joining areas 72 formed in step S13. Therefore, the strength of joining the case 1 with the second end member 2 is ensured.

With the manufacturing method according to the present embodiment, the first end member 14 and the second end member 2 are prepared in the same step S12. Therefore, in comparison with the case where these end members are separately prepared, manufacturing cost and cost of an end product are reduced.

With the manufacturing method according to the present embodiment, the frame member of the case 1 is joined with the first end member 14 of the case 1. Since the joining itself is easy, a case is easily prepared. Therefore, an end product is manufactured at low cost.

What is claimed is:

1. A manufacturing method for a battery including a cell array and a case, the manufacturing method comprising:
in space surrounded by a pair of compartment members of the case and a first end member of the case, placing the cell array, and a second end member facing the first end member across the cell array, the cell array including a plurality of single cells arranged in a longitudinal direction of each of the compartment members, and the first end member being provided at a first end of the case in the longitudinal direction; and joining each of the compartment members with the second end member at a second end in the longitudinal direction while applying a load to bind the cell array in a direction to compress the cell array from an outside part of the second end member, wherein the load is applied by the outside part only to the second end member, and no load is applied to the first end member, wherein the single cells include an electrode assembly.

2. The manufacturing method according to claim 1, wherein:
the case further includes a coupling member coupling the compartment members;
the manufacturing method further comprises preparing a frame member of the case; and
in preparing the frame member, the compartment members and the coupling member are integrally molded by press working of a piece of sheet material.

3. The manufacturing method according to claim 1, wherein:
in a depth direction of the case, perpendicular to the longitudinal direction, a length of the second end member is less than or equal to a length of each of the compartment members facing the second end member; and
in joining each of the compartment members with the second end member, an edge of the second end member is welded to a surface of each of the compartment members, facing the edge of the second end member.

4. The manufacturing method according to claim 1, wherein joining each of the compartment members with the second end member includes
applying the load to a center part of a side face of the second end member, and
welding an edge of the second end member to a surface of each of the compartment members, facing the edge of the second end member.

5. The manufacturing method according to claim 1, wherein:
the second end member includes a tray-shaped member having an outer face facing a side face of the cell array, and a support member supporting an inner face of the tray-shaped member;
the support member includes a contact part in contact with the inner face, a parallel part provided parallel to the contact part, and a coupling part coupling the contact part and the parallel part;
the contact part and the parallel part extend in a direction in which the compartment members face each other; and in joining each of the compartment members with the second end member, the load is applied to the parallel part.

6. The manufacturing method according to claim 1, wherein:
the second end member includes a tray-shaped member having an outer face facing a side face of the cell array, and a support member supporting an inner face of the tray-shaped member;
the support member includes a contact part in contact with the inner face, a parallel part extending parallel to the contact part, and a coupling part coupling the contact part and the parallel part;
the contact part and the parallel part extend in a direction in which the compartment members face each other;
the manufacturing method further comprises preparing the second end member;
in preparing the second end member, an edge of the parallel part is welded to the inner face facing the edge of the parallel part;
in joining each of the compartment members with the second end member, an edge of the tray-shaped member is welded to a surface of each of the compartment members, facing the edge of the tray-shaped member; and
in a direction of the tray-shaped member, parallel to the longitudinal direction, a joining area joined with each of the compartment members is different from a joining area joined with the support member.

7. The manufacturing method according to claim 1, further comprising:
preparing a frame member of the case;
preparing the first end member; and
preparing the case, wherein:
preparing the case includes
placing the first end member at an end of the frame member, and
joining each of the compartment members with the first end member.

8. The manufacturing method according to claim 1, wherein:
the first end member and the second end member are made from a same member; and
the manufacturing method further comprises preparing the first end member and the second end member.

9. The battery manufacturing method according to claim 1, wherein after joining each of the compartment members with the second end member, the outside part is removed.

10. A battery manufactured by the manufacturing method according to claim 1.

* * * * *